(12) United States Patent
Fera et al.

(10) Patent No.: US 7,051,044 B1
(45) Date of Patent: May 23, 2006

(54) METHOD AND SYSTEM FOR REMOTELY MANAGING COMMUNICATION OF DATA USED FOR PREDICTING MALFUNCTIONS IN A PLURALITY OF MACHINES

(75) Inventors: Gregory John Fera, Erie, PA (US); Eric Harold Hedlund, Erie, PA (US); Steven Loncher, Erie, PA (US); John H. Lovelace, Erie, PA (US); Thomas E. O'Camb, Erie, PA (US); James E. Pander, Erie, PA (US); Ashish Puri, Erie, PA (US); Michael J. Pierro, Erie, PA (US)

(73) Assignee: General Electric Company, Schenectady, NY (US)

( * ) Notice: Subject to any disclaimer, the term of this patent is extended or adjusted under 35 U.S.C. 154(b) by 834 days.

(21) Appl. No.: 09/685,288

(22) Filed: Oct. 10, 2000

Related U.S. Application Data

(63) Continuation-in-part of application No. 09/429,380, filed on Oct. 28, 1999, now Pat. No. 6,324,659, and a continuation-in-part of application No. 09/512,156, filed on Feb. 24, 2000, now Pat. No. 6,338,152.

(60) Provisional application No. 60/161,967, filed on Oct. 28, 1999.

(51) Int. Cl.
*G06F 17/00* (2006.01)
(52) U.S. Cl. ...................... 707/104.1; 707/1
(58) Field of Classification Search .............. 290/52; 246/169 R; 187/393; 340/10.3, 584, 521; 345/709; 455/456.1; 358/1.14; 700/1, 286; 702/57, 183, 181, 184, 179, 186; 701/115, 701/19, 29, 33, 35; 707/4, 104.1, 110, 100; 709/224, 203; 713/1; 714/2, 48, 31, 25, 714/26, 45; 399/8; 376/215
See application file for complete search history.

(56) References Cited

U.S. PATENT DOCUMENTS 4,270,174 A   5/1981   Karlin et al. ............... 701/115

(Continued)

OTHER PUBLICATIONS

Data-Tronic Gas Turbine Information And Control System; General Electric Gas Turbine Reference Library: 8 pgs.

*Primary Examiner*—Apu Mofiz
*Assistant Examiner*—Yicun Wu
(74) *Attorney, Agent, or Firm*—Enrique J. Mora; Beusse, Wolter, Sanks, Mora & Maire, P.A.

(57) ABSTRACT

A method and system for managing communication of electronic data between a diagnostic service center and a plurality of mobile assets (10) generally remote relative to each other is provided. The electronic data comprises at least respective mobile asset data indicative of respective performance of the plurality of mobile assets. The mobile asset data used for detecting the presence of potential malfunctions which, if left uncorrected, would likely result in respective mission failures of the assets. The method allows for storing in a database (104) a list of respective cases to be processed. The method further allows for assigning to each case a respective download priority. A determining action allows for determining each case to be populated next with new mobile asset data based upon the assigned download priority. Respective executing actions allow for executing a download of the new mobile asset data between the diagnostic service center and a respective one of the mobile assets, and for executing predetermined analysis on the downloaded data for detecting the presence of respective potential malfunctions in the mobile assets. The download of data may be executed automatically whenever critical faults occur in the mobile assets.

9 Claims, 13 Drawing Sheets

U.S. PATENT DOCUMENTS

| | | | |
|---|---|---|---|
| 4,463,418 A | 7/1984 | O'Quin, II et al. | 714/2 |
| 4,517,468 A | 5/1985 | Kemper et al. | 290/52 |
| 4,695,946 A | 9/1987 | Andreasen et al. | 714/31 |
| 4,823,914 A | 4/1989 | McKinney et al. | 187/393 |
| 4,970,725 A | 11/1990 | McEnroe et al. | 714/25 |
| 4,977,390 A | 12/1990 | Saylor et al. | 340/521 |
| 5,113,489 A | 5/1992 | Cihiwsky et al. | 358/1.14 |
| 5,123,017 A | 6/1992 | Simpkins et al. | 714/26 |
| 5,200,958 A * | 4/1993 | Hamilton et al. | 714/45 |
| 5,274,572 A | 12/1993 | O'Neill et al. | 702/57 |
| 5,282,127 A | 1/1994 | Mii | 700/1 |
| 5,311,562 A * | 5/1994 | Palusamy et al. | 376/215 |
| 5,321,837 A | 6/1994 | Daniel et al. | 707/4 |
| 5,329,465 A | 7/1994 | Arcella et al. | 702/184 |
| 5,400,018 A | 3/1995 | Scholl et al. | 340/10.3 |
| 5,406,502 A | 4/1995 | Haramaty et al. | 702/183 |
| 5,445,347 A | 8/1995 | Ng | 246/169 R |
| 5,508,941 A | 4/1996 | Leplingard et al. | 709/224 |
| 5,528,516 A | 6/1996 | Yemini et al. | 702/181 |
| 5,594,663 A | 1/1997 | Messaros et al. | 702/184 |
| 5,596,712 A * | 1/1997 | Tsuyama et al. | 714/26 |
| 5,633,628 A | 5/1997 | Denny et al. | 340/584 |
| 5,638,273 A * | 6/1997 | Coiner et al. | 701/35 |
| 5,638,296 A | 6/1997 | Johnson et al. | 700/286 |
| 5,661,668 A | 8/1997 | Yemini et al. | 702/186 |
| 5,666,534 A | 9/1997 | Gilbert et al. | 713/1 |
| 5,678,002 A | 10/1997 | Fawcett et al. | 343/709 |
| 5,742,915 A | 4/1998 | Stafford | 455/456.1 |
| 5,950,147 A | 9/1999 | Sarangapani et al. | 702/179 |
| 6,295,492 B1 * | 9/2001 | Lang et al. | 701/33 |
| 6,338,152 B1 * | 1/2002 | Fera et al. | 714/48 |
| 6,526,341 B1 * | 2/2003 | Bird et al. | 701/35 |
| 6,631,247 B1 * | 10/2003 | Motoyama et al. | 399/8 |
| 6,650,949 B1 * | 11/2003 | Fera et al. | 700/79 |
| 6,847,988 B1 * | 1/2005 | Toyouchi et al. | 709/203 |

* cited by examiner

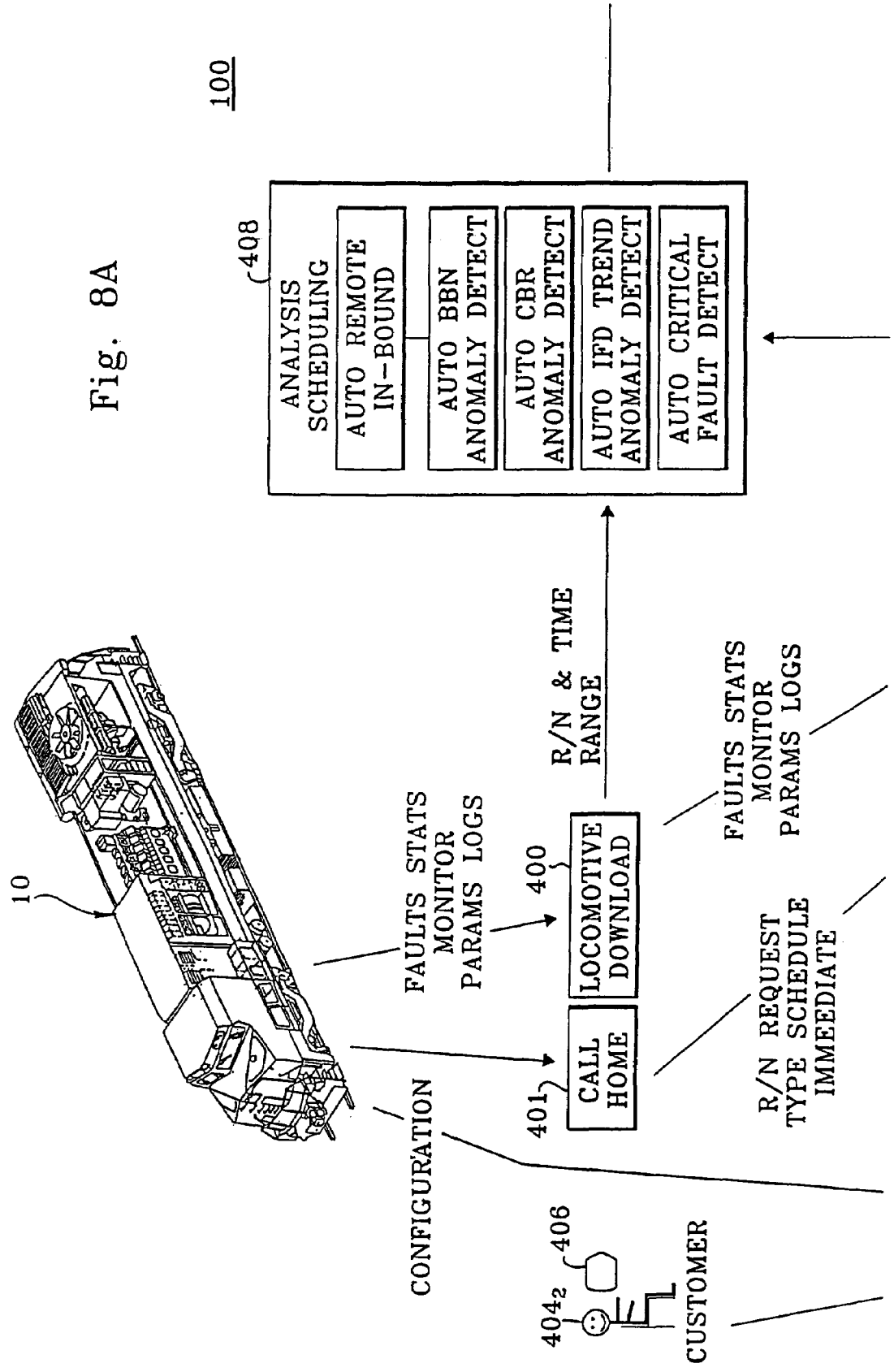

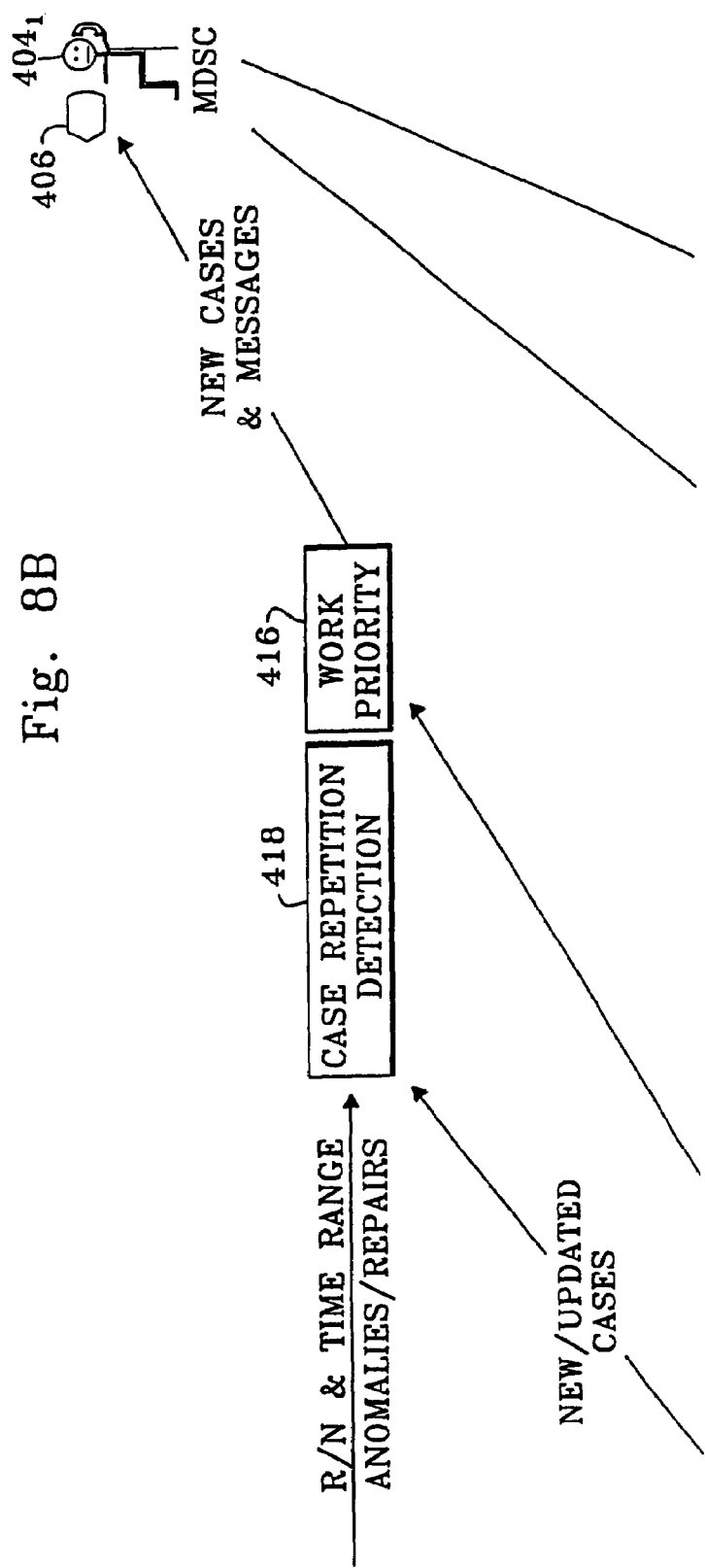

METHOD AND SYSTEM FOR REMOTELY MANAGING COMMUNICATION OF DATA USED FOR PREDICTING MALFUNCTIONS IN A PLURALITY OF MACHINES

SPECIFIC DATA RELATED TO THE INVENTION

This application is a continuation-in-part of U.S. Ser. No. 09/429,380, filed Oct. 28, 1999 now U.S. Pat. No. 6,324,659 and a continuation-in-part of U.S. Ser. No. 09/512,156, filed Feb. 24, 2000 now U.S. Pat. No. 6,338,152 and claims the benefit of U.S. provisional application, Ser. No. 60/161,967, filed Oct. 28, 1999.

BACKGROUND OF THE INVENTION

This invention generally relates to a method and system for predicting malfunctions or breakdowns of machines, such as locomotives, and, more particularly, this invention relates to a method and system for remotely managing communication of data used for predicting malfunctions between a plurality of machines and a monitoring and diagnostic service center (MDSC).

A locomotive is one example of a complex electromechanical system comprised of several complex subsystems. Each of these subsystems is built from components which over time will fail. When a component does fail, it is difficult to identify the failed component because the effects or problems that the failure has on the subsystem are often neither readily apparent in terms of their source nor unique. The ability to automatically diagnose problems that have occurred or will occur in the locomotive systems has a positive impact on minimizing locomotive downtime.

Previous attempts to diagnose problems occurring in a locomotive have been performed by experienced personnel who have in-depth individual training and experience in working with locomotives. Typically, these experienced individuals use available information that has been recorded in a log. Looking through the log, the experienced individuals use their accumulated experience and training in mapping incidents occurring in locomotive systems to problems that may be causing the incidents. If the incident-problem scenario is simple, then this approach works fairly well. However, if the incident-problem scenario is complex, then it is very difficult to diagnose and correct any failures associated with the incidents.

Currently, computer-based systems are being used to automatically diagnose problems in a locomotive in order to overcome some of the disadvantages associated with relying completely on experienced personnel. Typically, a computer-based system utilizes a mapping between the observed symptoms of the failures and the equipment problems using techniques such as table look ups, a symptom-problem matrices, and production rules. These techniques work well for simplified systems having simple mappings between symptoms and problems. However, complex equipment and process diagnostics seldom have such simple correspondences. In addition, not all symptoms are necessarily present if a problem has occurred, thus making other approaches more cumbersome.

The above-mentioned approaches either take a considerable amount of time before failures are diagnosed, or provide less than reliable results, or are unable to work well in complex systems. There is a need to be able to quickly and efficiently determine the cause of any failures occurring in the locomotive systems, while minimizing the need for human intervention.

U.S. Pat. No. 5,845,272 discloses an on-board locomotive diagnostic system. The system is useful for identifying locomotive systems problems and proposing remedial measures to repair or correct the problems. On-board diagnostic systems, however, do not presently communicate with a rail carrier's maintenance or scheduling centers. Consequently, those centers do not have direct access to subsystems data from remote locomotives which would be helpful in optimizing locomotive maintenance scheduling and route planning while minimizing locomotive downtime and mission failures arising from unexpected breakdowns.

Accordingly, it would be desirable to provide a communication data management system that will download files from and upload files to respective ones of the locomotives based on predetermined schedule and criteria, such as may be received and/or retrieved from a suitable database. It will be further desirable that, upon downloading the appropriate files from any respective locomotive, the communication data management system be able to readily format and store the downloaded files in appropriate directories on a predetermined server, and update any relevant records in the database. It will also be desirable that for uploading into a given locomotive, the system be able to retrieve the appropriate upload files from the server and then format and transmit the files to the locomotive while updating relevant records in the database. It is also desirable that the system be able to monitor any communication-enabling resources available to it (e.g., modems, transceivers, satellite links, wireless links, etc.) and utilize the appropriate resource for a specific type of download. It would also be desirable that the system be able to manage "locomotive call home" cases, such as may occur upon detection by the onboard diagnostics, of critical faults that are known to cause locomotive road failures due to, for example, loss of locomotive power. It is especially desirable to proactively manage such critical faults that could result in unscheduled shutting down or substantially slowing down vehicle operation, since such shutdowns or slowdowns are costly and highly inconvenient. It is also desirable to provide a system that automatically schedules diagnostics using the downloaded data for detecting incipient failures and dealing with any predicted failures before they occur.

BRIEF SUMMARY OF THE INVENTION

Generally speaking, the present invention fulfills the foregoing needs by providing a method for managing communication of electronic data between a diagnostic service center and a plurality of mobile assets generally remote relative to each other. The electronic data comprises at least respective mobile asset data indicative of respective performance of the plurality of mobile assets. The mobile asset data used for detecting the presence of potential malfunctions which, if left uncorrected, would likely result in respective mission failures of the assets. The method allows for storing in a database a list of respective cases to be processed. The method further allows for assigning to each case a respective download priority. A determining action or step allows for determining each case to be populated next with new mobile asset data based at least upon the assigned download priority. Respective executing actions or steps allow for executing a download of the new mobile asset data between the diagnostic service center and a respective one of the mobile assets, and for executing predetermined analysis on the downloaded data for detecting the presence of respective potential malfunctions in the mobile assets.

The present invention in another aspect thereof further fulfills the foregoing needs by providing a method for identifying critical faults in a plurality of mobile assets. The method comprises the following steps:

a) collecting from a group of the plurality of mobile assets respective mobile asset data indicative of each fault logged over a predetermined period of time;

b) classifying respective faults in the collected mobile asset data based on the following criteria:

1) relative frequency of fault occurrence;
2) number of mobile assets affected in the group; and
3) expected level of mobile asset degradation;

wherein any of the three criteria comprises a first basis of classification, and a second classification is based on the results of the first classification so that any faults found to be critical include properties in at least two of the classifications; and c) storing any faults found to be critical in a database of critical faults.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
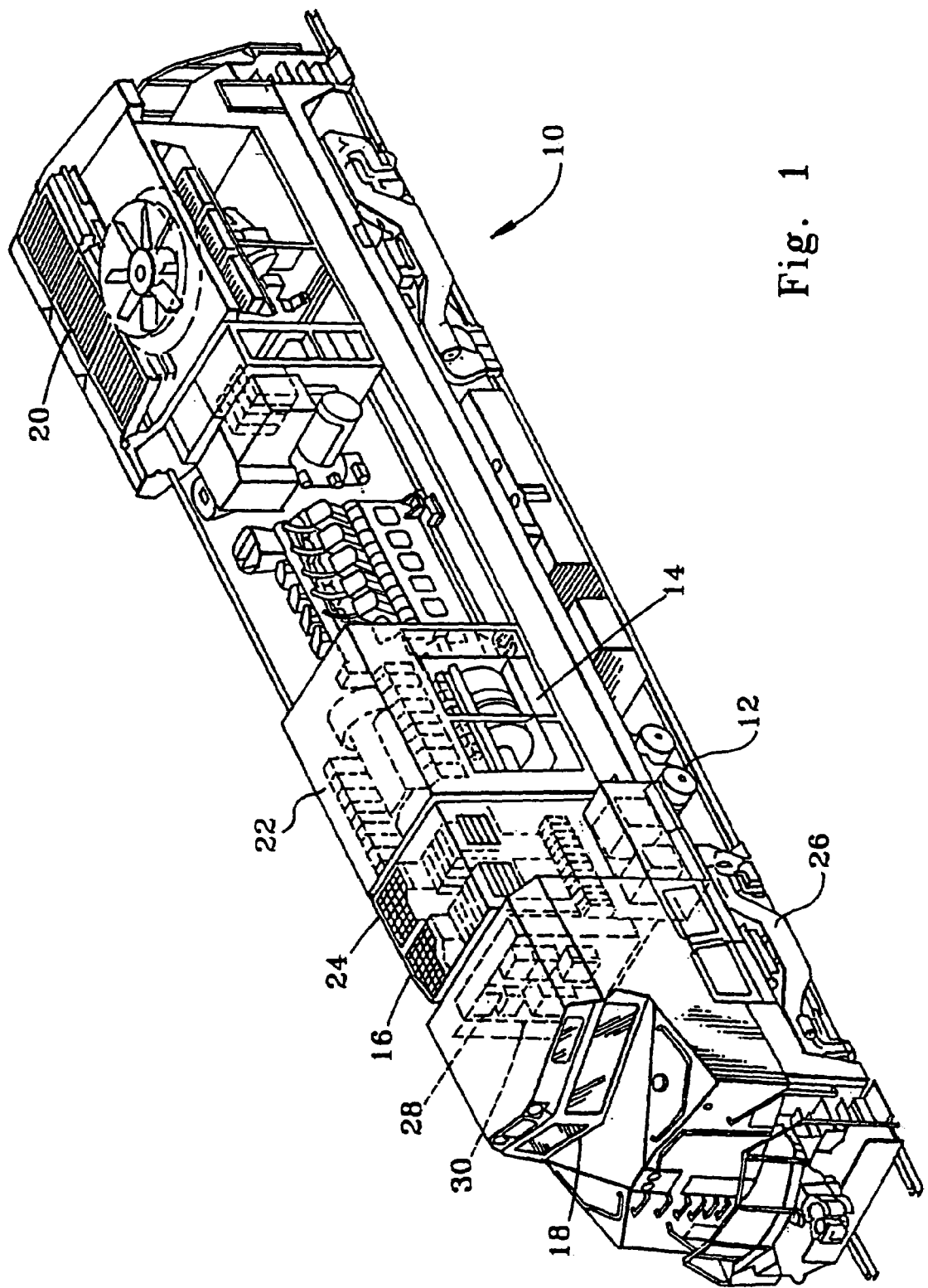
FIG. 1 shows an exemplary machine, e.g., a locomotive, that may readily benefit from the teachings of the present invention.

FIG. 1 shows a schematic of an exemplary locomotive 10. Locomotive 10 is one example of mobile assets comprising large land-based self-powered transport equipment. Other example of mobile assets may be trucks, buses, off-road vehicles used for industrial applications. The locomotive may be either an AC or DC locomotive. The locomotive 10 is comprised of several complex systems, each performing separate functions. Some of the systems and their functions are listed below. Note that the locomotive 10 is comprised of many other systems and that the present invention is not limited to the systems disclosed herein.

An air and air brake system 12 provides compressed air to the locomotive, which uses the compressed air to actuate the air brakes on the locomotive and cars behind it.

An auxiliary alternator system 14 powers all auxiliary equipment. In particular, it supplies power directly to an auxiliary blower motor and an exhauster motor. Other equipment in the locomotive is powered through a cycle skipper.

A battery supplies power to a cranker system 16 to start operation of a Diesel engine for operation of a DC bus and a HVAC system. The DC bus in turn provides voltage to maintain the battery at an optimum charge.

An intra-consist communications system collects, distributes, and displays consist data across all locomotives in the consist.

A cab signal system 18 links the wayside to the train control system. In particular, the system 18 receives coded signals from the rails through track receivers located on the front and rear of the locomotive. The information received is used to inform the locomotive operator of the speed limit and operating mode.

A distributed power control system provides remote control capability of multiple locomotive consists anywhere in the train. It also provides for control of tractive power in motoring and braking, as well as air brake control.

An engine cooling system 20 provides the means by which the engine and other components reject heat to the cooling water. In addition, it minimizes engine thermal cycling by maintaining an optimal engine temperature throughout the load range and prevents overheating in tunnels.

An end of train system provides communication between the locomotive cab and last car via a radio link for the purpose of emergency braking.

An equipment ventilation system 22 provides the means to cool the locomotive equipment.

An event recorder system records FRA required data and limited defined data for operator evaluation and accident investigation. It can store up to 72 hours of data, for example.

A fuel monitoring system provides means for monitoring the fuel level and relaying the information to the crew.

An exemplary global positioning system uses satellite signals to provide accurate position, velocity and altitude measurements to the control system. In addition, it also provides a precise UTC reference to the control system.

A mobile communications package system provides the main data link between the locomotive and the wayside via a suitable radio, (e.g., a 900 MHz radio).

A propulsion system 24 provides the means to move the locomotive. It also includes the traction motors and dynamic braking capability. In particular, the propulsion system 24 receives power from the traction alternator and through the traction motors converts it to locomotive movement.

A shared resources system includes the I/O communication devices, which are shared by multiple systems.

A traction alternator system 26 converts mechanical power to electrical power which is then provided to the propulsion system.

A vehicle control system reads operator inputs and determines the locomotive operating modes.

The above-mentioned systems are monitored by an on-board monitor (OBM) system 28. The OBM system 28 keeps track of any incidents occurring in the systems with an incident log. Locomotive 10 may optionally include an on-board diagnostic system 30, such as described in greater detail in U.S. Pat. No. 5,845,272.

Figure 2:
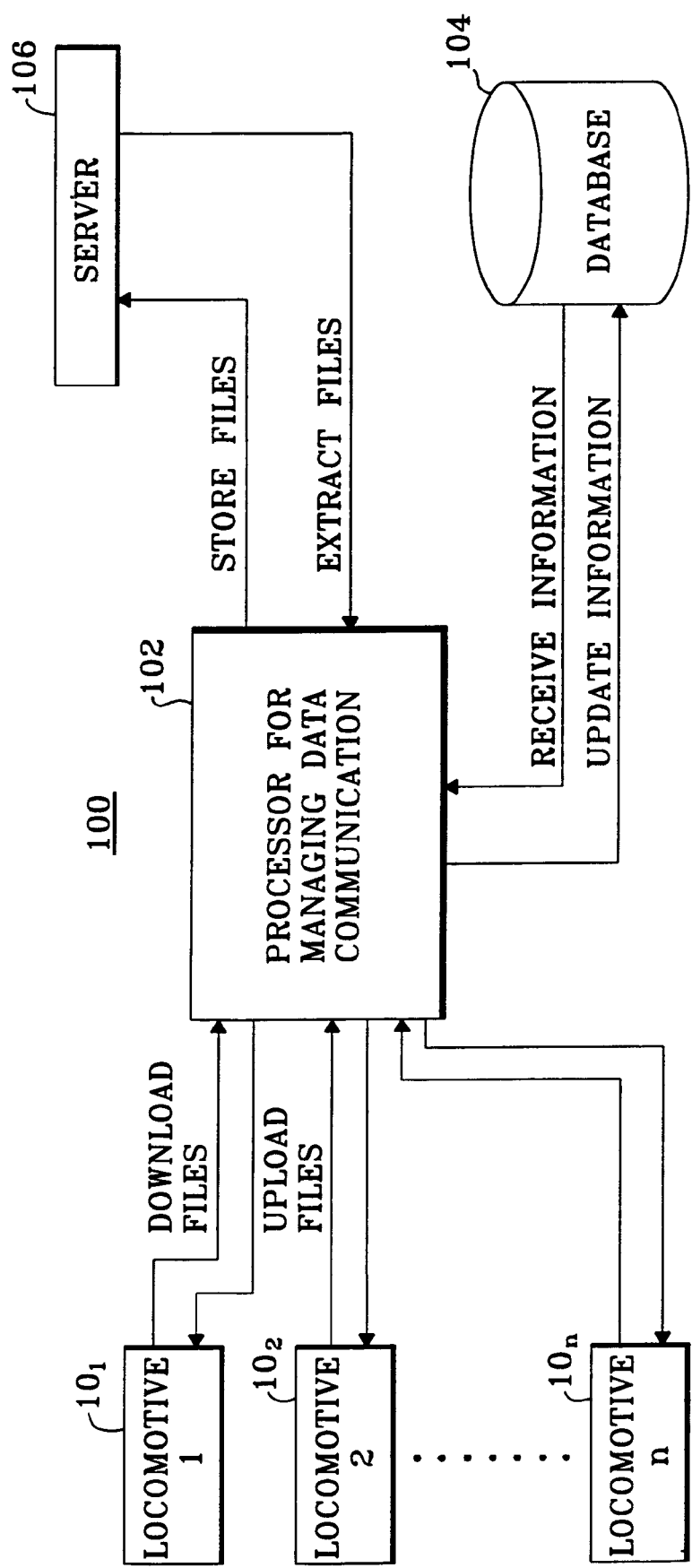
FIG. 2 shows an exemplary block diagram representation of the system of the present invention.

As shown in FIG. 2, a communication data management system 100 uses a processor 102 that allows for managing each case due for a download from respective locomotives (e.g., locomotives $10_1, 10_2 \ldots 10_n$) and allows for executing respective download/uploads for all cases, including the call home cases, that, as suggested above, could arise upon detection of critical faults onboard the locomotive. In the diagnostic context, a case generally refers to a problem/solution description pair that represents a diagnosis of a problem and an appropriate repair. More particularly, a case is a collection of fault log and corresponding continuous and snapshot data patterns and other parameters and indicators associated with one specific repair event in the machine under consideration. A database 104, e.g., a Clarify database or any other suitable commercially available database, allows for storing respective records of every case. It will be appreciated that generally each case has an assigned scheduled download due time. Processor 102 processes the records stored in database 104 so as to determine the respective cases that are due for a download based on the assigned due time. Processor 102 also determines the relative priority of each download case based on a respective download priority assigned to each download case. Processor 102 may thus determine the sequence of the cases to be downloaded based both on the respective download priority of the case and the respective download due time of the case.

For a given case to be downloaded, processor 102 retrieves any other information required to carry out the actual transfer of files between the locomotive and a suitable server (106), e.g., database server. By way of example, such information could include actions to be performed (e.g., downloading or uploading), files to be transferred, destination and source of the files, etc. As suggested above, processor 102 manages the various communication-enabling resources (e.g., modems, satellite links, wireless links, etc.) available to carry out any data downloads or uploads. For example, the system may be assigned a respective number of communication-enabling resources (modems, etc.) to carry out respective downloads. Processor 102 can then monitor the number of assigned resources being utilized at a given instance and carry out the next download upon availability of a free resource. By way of example and not of limitation, the resources may be assigned at least under two categories, emergency resources and other resources. All download cases with download priority value of 2 or lower, assuming an exemplary priority scale from one to ten and further assuming the number one represent the highest relative priority, can utilize the emergency resources when all the "other resources" are being utilized. Exemplary operational interrelationships implemented by processor 102 are conveniently summarized below and such interrelationships allow processor 102 to:

Build a respective configuration to be uploaded to the locomotive for a given case. The predetermined parameters for building this file can be extracted from database 104 based on the case number and also on the "initial" file downloaded from the OBM.

Execute the actual transfer of files between the locomotive and server 106. This comprises transferring the files to be uploaded to the locomotive into appropriate directories on the OBM and storing the downloaded files from the OBM into appropriate directories on the server.

Modify respective filenames, as required, before storing them in specified locations.

After a successful download, notify an "analysis scheduling" subsystem by placing a predetermined record in a "dl_status" table in the database. This comprises providing respective filename, file location and the status of download for "active faults" and parameter data files to the analysis scheduling subsystem.

In case of an unsuccessful download attempt, execute a predetermined retry process based on the type of download and download priority of the failed download case. The retry process follow a predetermined logic based on the download type, priority and number of unsuccessful attempts for each case.

If the download attempts are unsuccessful even after making a maximum number of retries for a given case, then create a "problem" case and notify the appropriate processes/persons.

Maintain history-records of all downloads. The history will carry information pertaining to the start time, finish time, result, file size, parameter data size, etc. for each download. Further, in order to avoid downloading duplicate faults, a respective file tracking number or code may be assigned to each file so that files containing faults already downloaded are ignored. It will be appreciated that this feature may save substantial computational and communication-enabling resources that otherwise would be required if no file tracking number was used. For example, if a file containing faults one through ten has been downloaded and assigned a respective tracking number, then assuming the occurrence of five additional faults, then since the file tracking number of the file having the originally downloaded ten faults would be recognized, then this file would not be downloaded again and only the file containing the five additional faults would be downloaded.

By way of example and not of limitation, there may be one or more download types listed below:

Normal

This is a standard download carried out from every locomotive at a certain specified time interval.

Locomotive Call Home

As suggested above, this is a download carried out whenever a respective OBM calls home on occurrence of any critical fault or OBM operational events or incidents. Such cases are of relatively high priority and a download is scheduled promptly after the occurrence of such a call home. It will be appreciated that the OBM may also call home after it has finished collecting data for a custom data request from the MDSC. This type of call home should be differentiated from a critical fault call home by the directory in which the OBM writes a file after calling home. As explained below, handling of such a call home may be different than the handling of the critical fault call home.

Customer Request

These types of downloads are scheduled whenever a customer calls in the MDSC center and requests a download.

MDSC Request (Normal)

These types of downloads are carried out whenever the MDSC requests a customized data download or a normal download. For example, a custom data collection file "cdata_defim.txt" file is uploaded to the OBM. Further, the OBM calls back after it has finished collecting the requested data. A download from the OBM is done after the call home from the OBM to retrieve the custom data. Again, note that this type of call home may not be due to critical faults.

MDSC Request (Raw)

This type of download is done to download respective raw data files from the OBM upon request by the MDSC.

Locomotive OBM Installation

This is a data transfer for uploading configuration files to the OBM whenever a configuration change is needed such as when a new locomotive is commissioned, or new software is deployed on the OBM, etc.

As suggested above each respective download cases is assigned a download priority. By way of example, the respective priority may be assigned using numbers from 1 to 10. "1" representing the highest priority and "10" representing the lowest priority.

The various types of files exchanged between the server and each respective OBM may be tracked by respective file directories in the OBM since there will be a respective directory for each file type. These directories may contain the current files to be downloaded to the server and some previously transferred files (e.g., files kept over the last two days). The files obtained by the server may generally be made up of respective archived and compressed related group of files using data compression and archival techniques well-understood by those skilled in the art. For example, for handling active faults, a "faultact" directory on the OBM may contain all the "faultact" type files. When a fault occurs, the OBM writes an event file in the "faultact" directory. The OBM then tars and zips each of these respective files into a respective file-type archive for each file, e.g., file faultact.tgz, stored in the "faultactz" directory on the OBM, and also updates the "initial" file. Both of these files are generally always ready for transmission. The "faultact-.tgz" is the file to be downloaded for active faults. Any other files may also be stored in a similar manner. Instructions to the OBM for which files to delete and which files to start "tarring" records from, is provided in the filemaint.txt file, which may be uploaded to each respective locomotive OBM daily, for example, as part of a normal download.

Locomotive to Server Transfer for Normal Downloads:

This type of download generally occurs daily and may use suitable file transfer protocol commands, such as ftp get commands. Typical files transferred are summarized in Table 1 below:

TABLE 1

| FILE | DESCRIPTION | Directory on OBM |
| --- | --- | --- |
| initial | A comma separated file that specifies the last filename "tarred" in the different ".tgz" files | Initial |
| faultact.tgz | Active fault records and also contains startup and life files | Faultactz |
| faultreset.tgz | Reset fault records | Faulresetz |
| stats.tgz | Anomalies | Statsz |
| oplog.tgz | operation log | Oplogz |
| sigstr.tgz | Signal Strength | Sigstrz |

Server to Locomotive Transfer (Upload):

In this case, the file transfer protocol commands may comprise suitable ftp put commands for the filemaint.txt file may occur daily, however, for other files that generally are OBM configuration-related and need less frequent updating their respective ftp put commands may be expected to occur at relatively longer intervals, for example, about three times a year. Exemplary files that may be transferred during a respective upload include a maintenance file (e.g., filemaint-.txt") used to inform the OBM of which files to delete and which files are expected in the next transfer. As suggested above, this file may be uploaded as part of daily normal download. This file is loaded in the "filemaint" directory of the OBM.

The following exemplary configuration files are uploaded in the "config" directory of the OBM and are conveniently listed in Table 2 below. As suggested above, these uploads may take place on less frequent basis relative to the daily updates for the maintenance file.

TABLE 2

| FILE | DECRIPTION |
| --- | --- |
| OBMLOG.vvv | Operational log configuration file |
| call_home.vvv | Call Home Faults |
| global_data_def.vvv | Global Monitored Parameter Definition file |
| triggernnnn.vvv | Data collection trigger file |
| cdataN_defnnnn.vvv | Custom Data Definition file |
| mdscstartup.vvv | MDSC Loaded Startup configuration file |
| obmstartup_def.vvv | OBM Created Startup Definition File |
| versionfile.vvv | Version file |

Filename Format

An exemplary filename of each 'event' file on the OBM may be formatted as follows:

CCCC: 1–4 characters customer number

RRRRR: 1–5 digit road number. A dash is added at the end to make up five digits.

TTT: 1–3 characters file type abbreviation

00000000–99999999: 8 digits sequential file numbers

XXX: 3 characters file extension

For example, the file name "BN-9100-FLT00000001.Dat would correspond to the first fault-type file generated on the OBM BN9100. It will be appreciated that the above format is merely exemplary since other formatting configurations could be readily used.

As will be appreciated by those skilled in the art, every time a file is uploaded to the "config" directory on the OBM, the OBM should be restarted for the new "config" files to take effect. It will be appreciated that the OBM could be automatically restarted, or the OBM could be restarted through any suitable data transfer session, e.g., a telnet session, etc.

Figure 3:
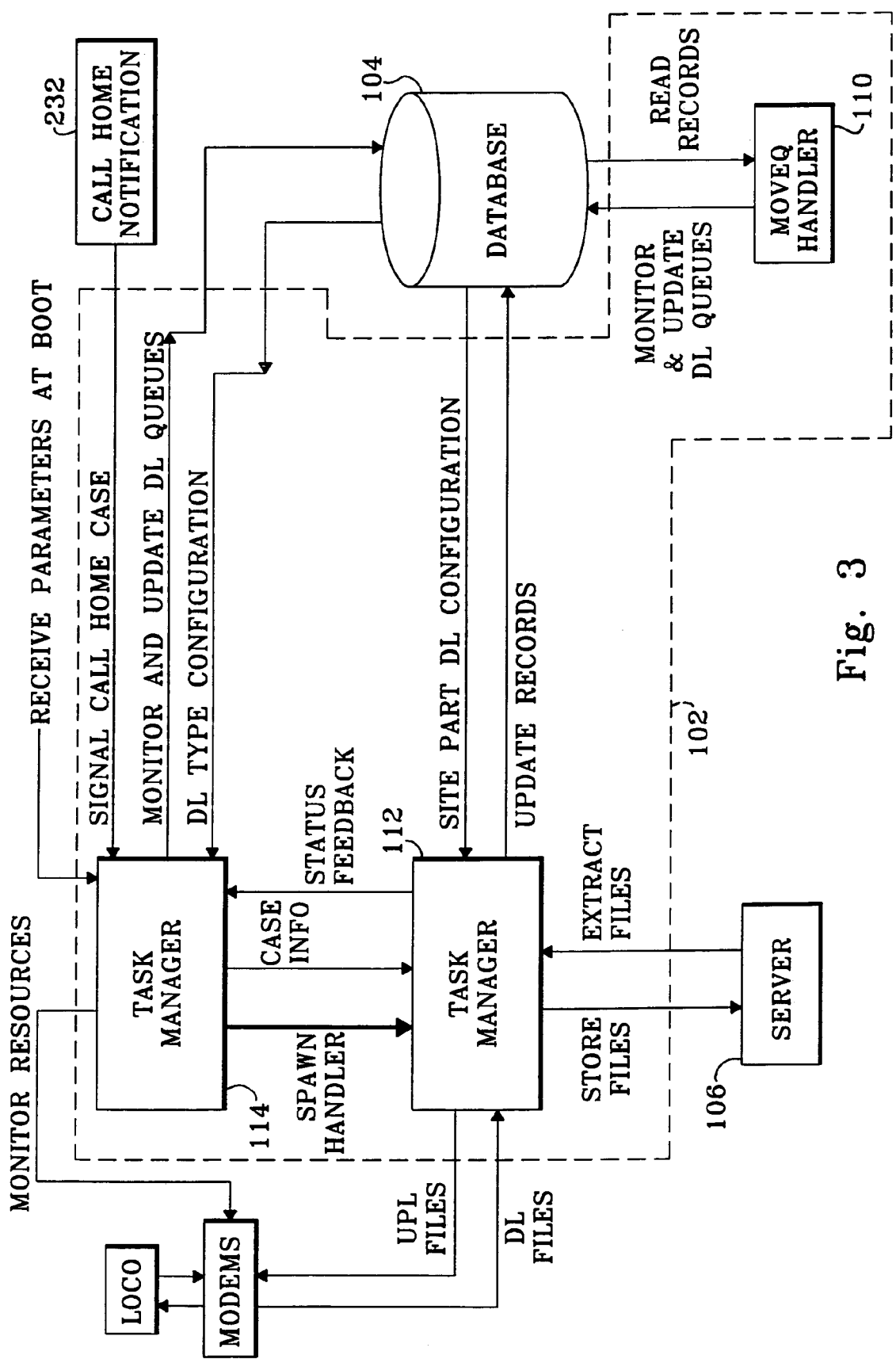
FIG. 3 shows further details partly in connection with various modules used by the system of FIG. 2.

As shown in FIG. 3, processor 102 includes a first module, e.g., MoveQ Handler module 110, coupled to database 104 for monitoring the database to find each respective case that is on hold for a download and, upon finding any such cases, then change the status of each respective case from a "Hold Queue" to a "Download Queue". MoveQ Handler module 110 determines whether a case is due for a download or not by comparing the scheduled download time for a case, such as may be defined in a "case table", with a predetermined time window. If the scheduled download time for a case lies within the predetermined time window and its status is "hold", MoveQ Handler module 110 will then change the status of the case to "Due".

As further shown in FIG. 3, a second module, e.g., Task Manager module 114, allows for managing communication-enabling resources (e.g., modems, etc.) by reading database 104 to identify any download task and spawning a third module, e.g., Task Handler module 112, to carry out the download process for a particular case number. Task Manager module 114 also manages the priority sequencing of the download tasks depending on the type of download (normal and others), download priority and the predetermined retry logic for a particular type of case.

Figure 4:
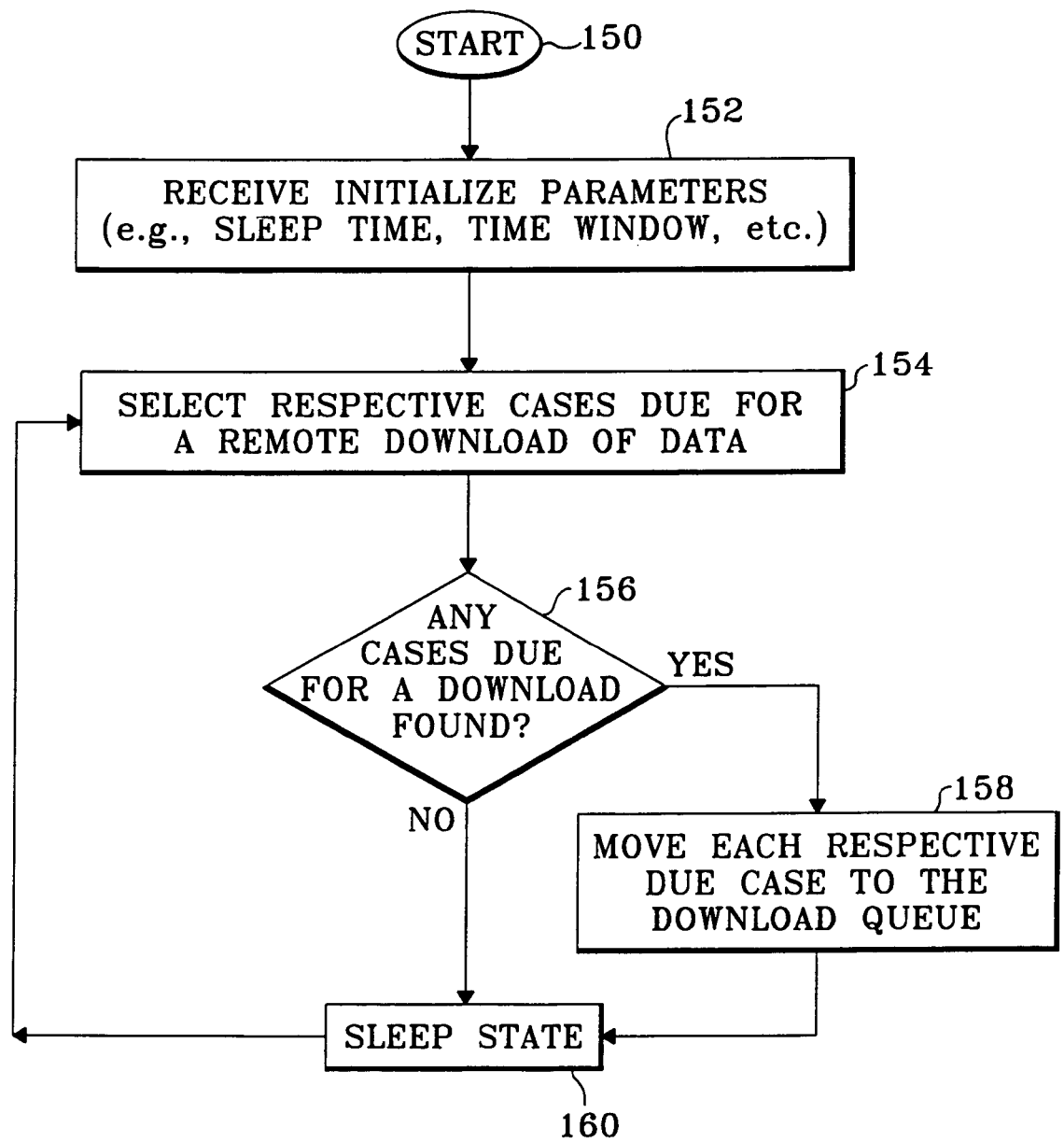
FIG. 4 show an exemplary flow chart of a queuing process implemented by one of the modules of FIG. 3, e.g., a queuing handler module.

FIG. 4 illustrates an exemplary flow chart of the process implemented by MoveQ Handler module 110, (FIG. 3). As illustrated in FIG. 4, subsequent to start step 150, step 152 allows for receiving various initialization parameters, such as "sleep time", "time window," etc. The "sleep time" is the time for which the processor goes to sleep (i.e., inactive) after a search attempt or an update event. The "time window" is the time which the processor utilizes to determine whether a case is due for download, or not. As will be understood by those skilled in the art, the "sleep time" should preferably be less-than-or-equal-to the "time window". This is to prevent unnecessary delay of due cases during the "sleep time" of the process.

As shown in FIG. 4, step 154 allows for selecting each case from the "case table" that is "Download" type and due for a download. A case is determined to be due if the queue status field of the case is set to "hold" and the "due time" for the case is less than or equal to the current time plus the time window. For example, let's assume that for a given case, the queue status equals "hold" and the "due time" equals 12:00:00 p.m. and the "time window" equals 60 seconds. If the current time (system time) is 11:59:00 a.m., then the particular case would be selected as a case due for download. If in step 156, a case is selected as a case due for a download then its queue status is changed from the "hold" queue to the "due" queue, as shown at step 158. This is done by changing the queue status field in the case table from the value representing "hold" to the value representing "due". Conversely, as shown at step 160, the process goes to sleep for a time equal to "sleep time" whenever it finds no due case in the "case table" and also after it finds cases due for download and updating their respective queue status to "due". After the sleep time, the process loops back to step 154, described above, so as to iteratively continue the download process.

Figures 5, 5A, 5B:
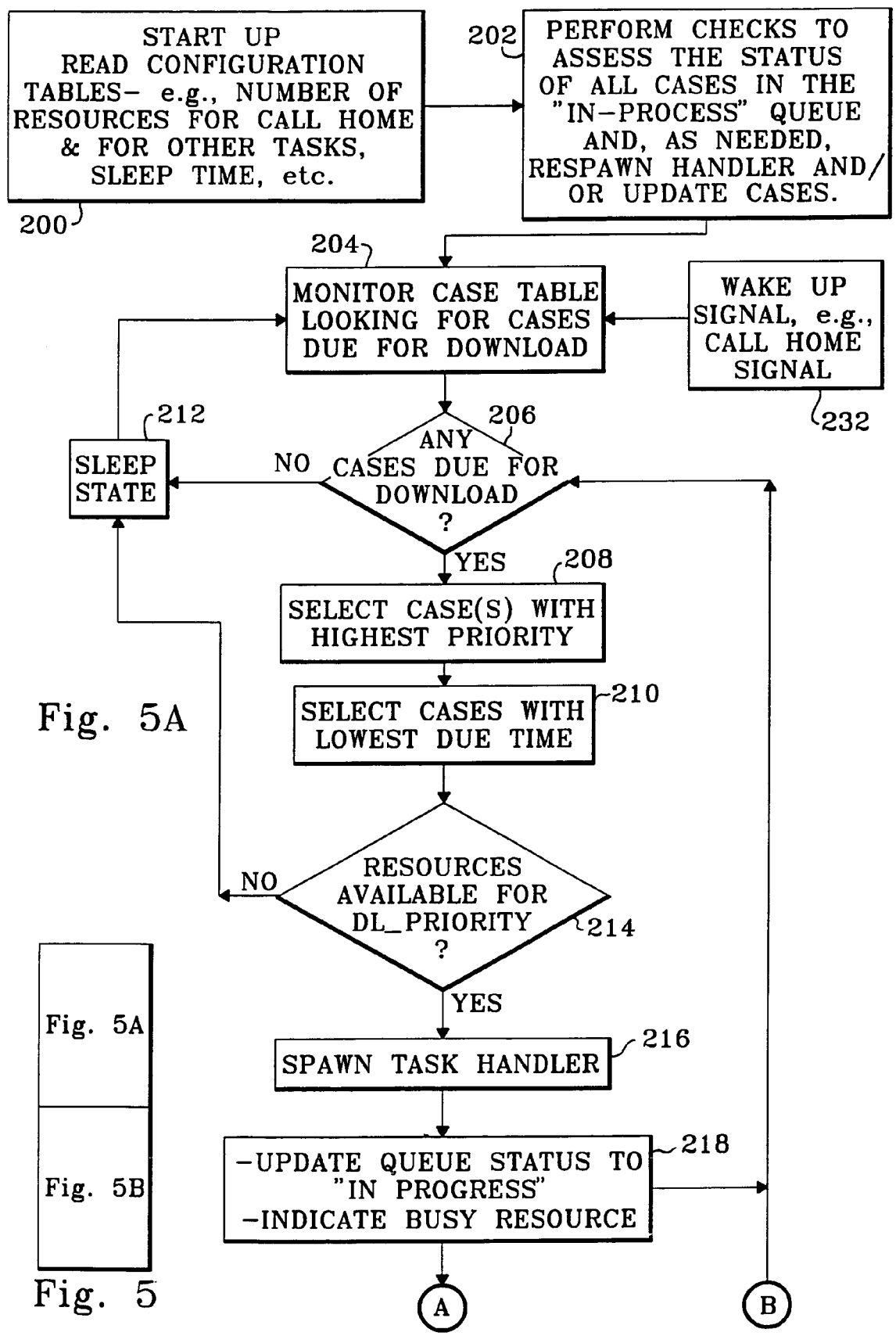
FIGS. 5A and 5B collectively show an exemplary flow chart of a system management process implemented by another of the modules of FIG. 3, e.g., a task manager module.
Figure 5B:
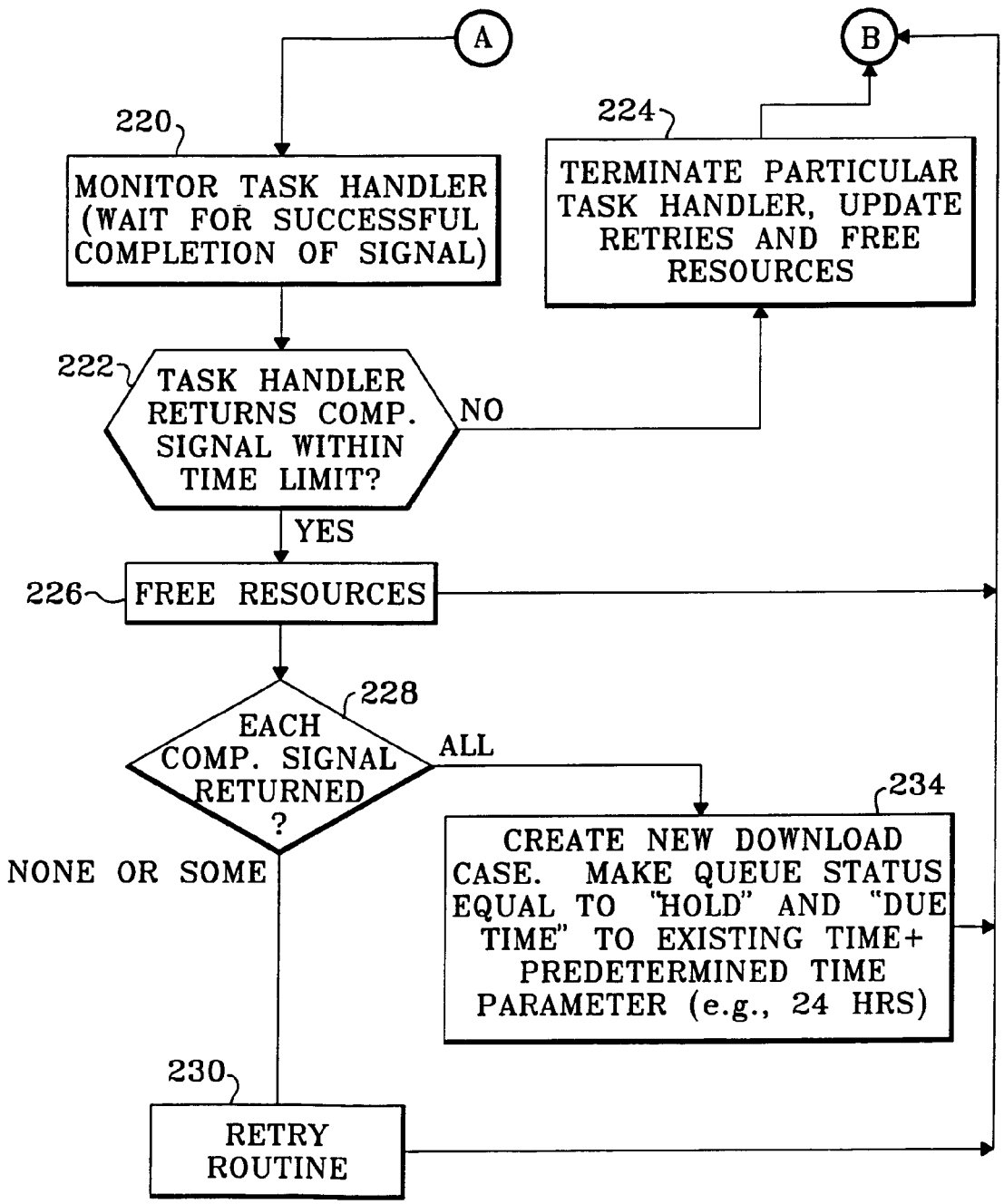

FIGS. 5A and 5B collectively illustrate an exemplary flow chart of the process enabled by Task Manager module 114, (FIG. 3). One instance, i.e., a single running copy, of the Task Manager module will generally start upon booting up of the system. The single Task Manager instance will typically manage most types of downloads. However, call home cases may be scheduled independently of the Task Manager module. As shown at step 200, upon start up, the Task Manager will retrieve the necessary parameters for commencing its respective operations from the configuration tables. By way of example, these parameters could include parameters indicative of download types, number of resources available for emergencies, number of resources for others, sleep time, etc. The Task Manager module 114 can also be signaled (e.g., by way of signal SIGUSR1) by a respective authorized user on the command line or from a respective application so that upon receiving this signal, Task Manager module 114 will re-read all of its configuration parameters.

As shown at step 202, subsequent to start up step 200, the Task Manager module will perform a number of predetermined checks to correctly assess the status of all respective cases existing in the "in-process" queue. Step 204, allows Task Manager module 114 for monitoring the case table in database 104 for respective download cases. If, as shown at step 206, there are any cases due for download, then selecting step 208 and 210 cooperate for scheduling any such cases for a respective download, at least based on their respective download priority and their respective due time. The cases with higher relative priority (e.g., lower value in the dl_priority field) will be downloaded first. Thus, it will be appreciated that Task Manager module 114 manages the respective sequencing and prioritizing of the download cases. By way of example, Task Manager module 114 may read a configuration table to configure the sequencing and prioritizing logic for the different types of downloads. If there is no case due for download, then sleep step 212 allows the system to be dormant for a predetermined period of time, prior to continuing additional monitoring iterations at step 204.

As suggested above and as shown at step 214, the Task Manager module 114 may manage communication-enabling resources based on information contained in a configuration table. For example, this table would specify how many modems have been assigned for emergencies and how many modems have been assigned for normal situations. As shown at step 216, the Task Manager will then spawn a number of copies of the Task Handler module based on the present number of "due" jobs and the present number of available resources, if any, for the download priority. As shown at step 218, assuming there is an available resource, Task Manager module 114 will then update the status of the download to "in-process". The Task Manager is configured to spawn one job per resource and to mark a resource as "occupied" for each job "in process". Task Manager module 114 will free up a respective resource after the Task Handler finishes working on a case and returns a code or signal indicative of successful completion of the assigned task.

Whenever the Task Manager module 114 (FIG. 3) identifies a download task to be performed and an appropriate resource available for the download type, it will spawn the Task Handler module 112 to carry out the file transfer process between the database server and a respective locomotive. As shown at step 220, through the connecting node labeled with the letter "A", Task Manager module 114 will also monitor all the respective Task Handlers it spawns. As shown at steps 222 and 224, if the Task Handler does not return a status code or signal within a specified time limit, the Task Manager will terminate the particular Task Handler and record an attempt in a "retries" table and free up a resource. Similarly, upon receipt of a successful completion signal, step 226 allows for freeing the resource used for the successfully completed download.

If, at step 228, not each successful completion signal is returned within the specified time limit, then at step 230, the Task Manager will also manage a retry routine for rescheduling unsuccessful download attempts made by the Task Handler. By way of example, the Task Manager may make use of two tables, e.g., dl_retries and dl_retry_logic, to manage the retry attempts for different types of download cases. The history of download attempts by the Task Handler for a particular download case may be recorded in the dl_retries table. The Task Manager will monitor the dl_retries table and reschedule the case for another download or create a new trouble case for the case. The task manager module will read the retry logic for that particular case from the dl_retry_logic table based on the type and priority of the download case.

In the event that a wake up or call home signal 232, e.g., due to a call home event, is sent to the Task Manager while the Task Manager is either executing monitoring step 204 or while in the sleep mode, a call home subsystem 401 (FIG. 8) reschedules and reprioritizes an existing normal download case due for a download by changing download due time and download priority. It also changes the download type to a "call home". The call home subsystem also sends a signal to the Task Manager to notify it that a call home has occurred. The Task Manager may further receive signal 232 when a user changes the type of download for an existing download case from normal to some other type. The Task Manager receives the signal and if it is in the sleep mode it wakes up and looks at the case table searching for due cases. If the status of the call home case is due, the Task Manager spawns a respective Task Handler to carry out the call home download. If a normal resource is not available it can use a resource reserved for call home cases. If the call home case is already "in process," the Task Manager continues the download but changes it internally as a call home type to carry out the retry logic.

As shown at 234, on completion of a successful download by the Task Handler, the Task Manager will update the status of the respective download case in the "case" table to indicate such successful completion. The Task Manager will also create a new download case for the particular locomotive. The queue status for the new case should be "hold" and the due time should be made equal to the existing time plus a predetermined time (e.g., 24 hrs). Information for creating the new download case will be read from the "retry_logic" table. After all the retry attempts for a download have failed, the Task Manager will create a problem case and notify the appropriate processes and personnel.

Figures 6, 6A:
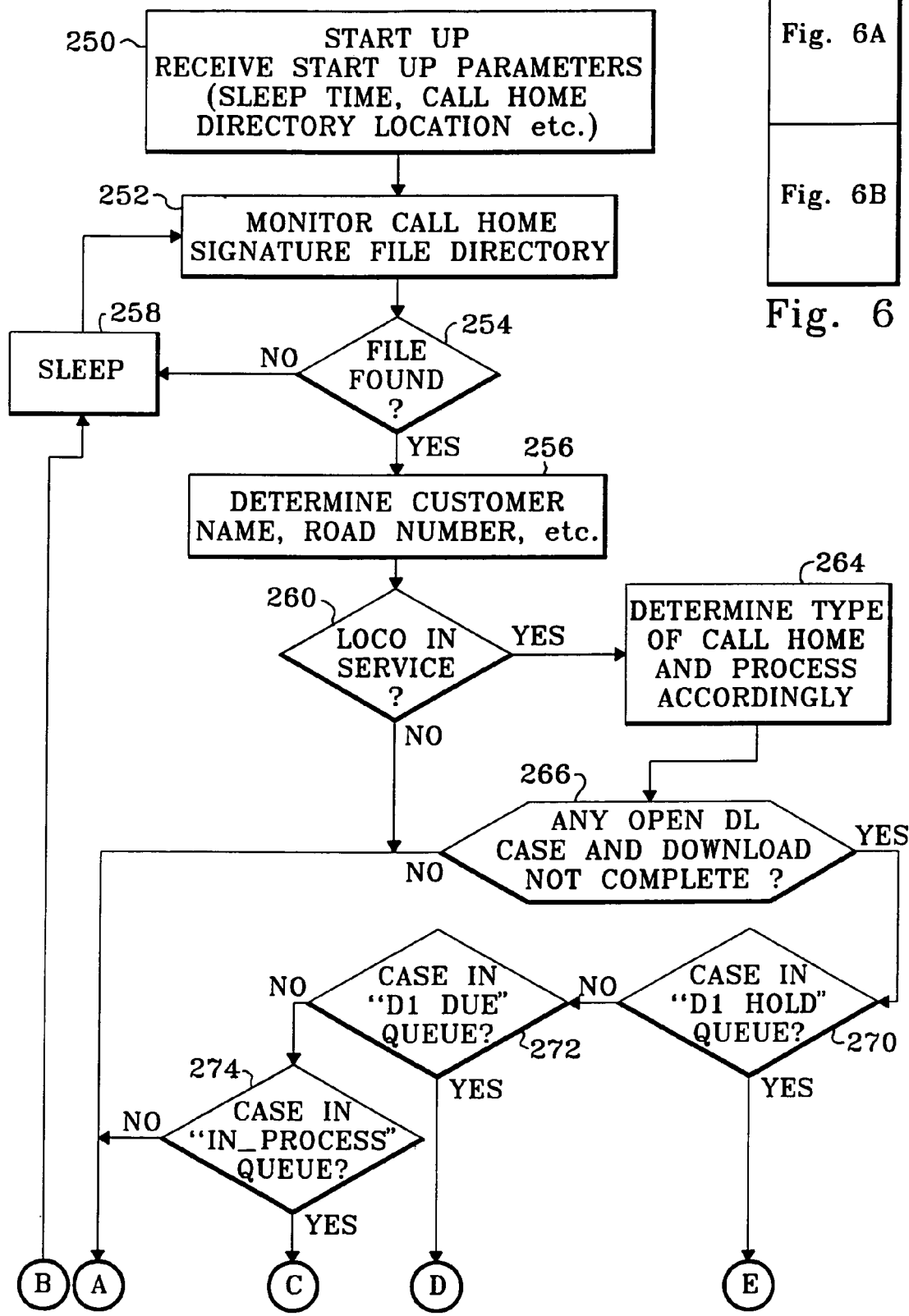
FIGS. 6A and 6B collectively show an exemplary flow chart of a locomotive call home notification process.
Figure 6B:
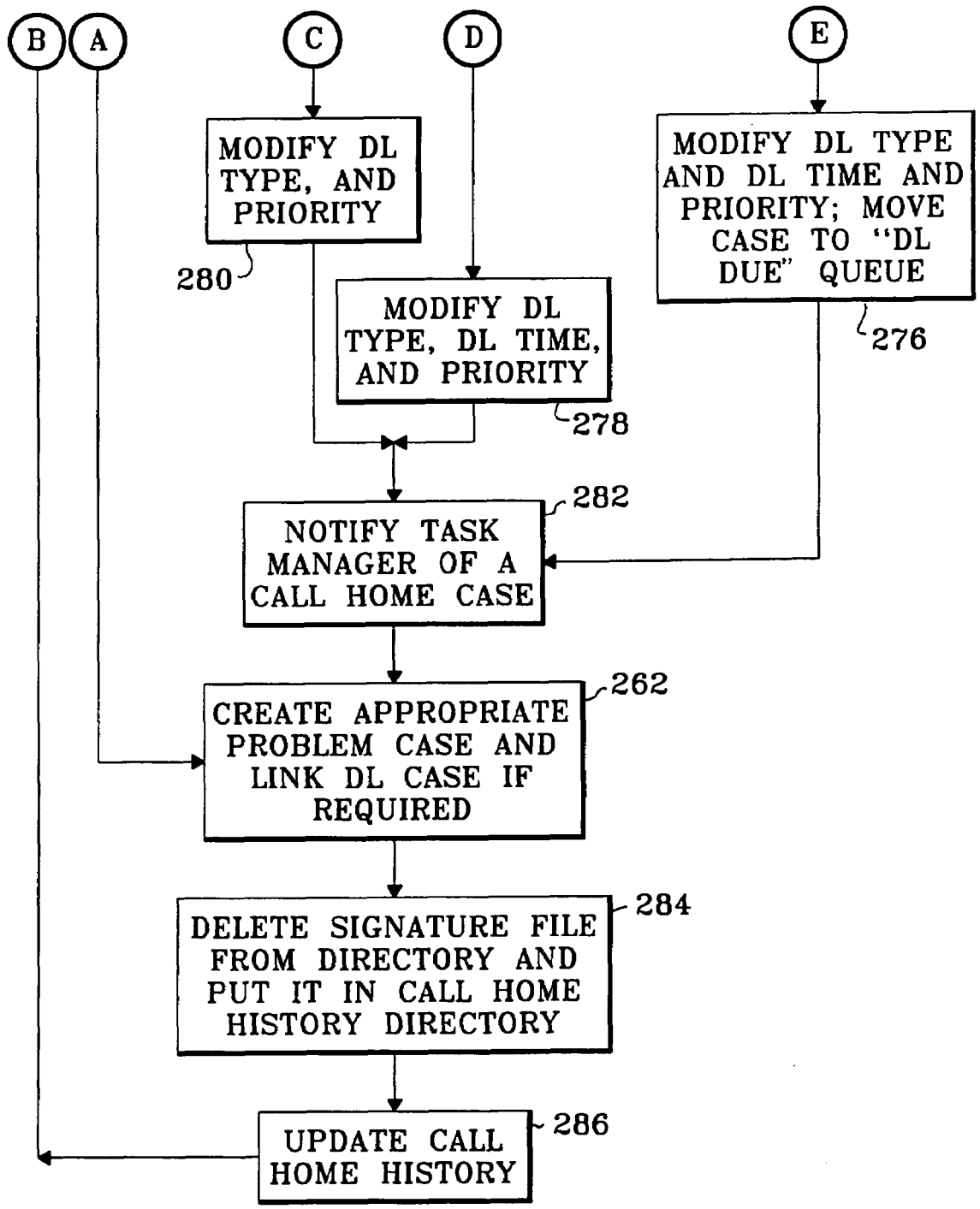
Figure 8C:
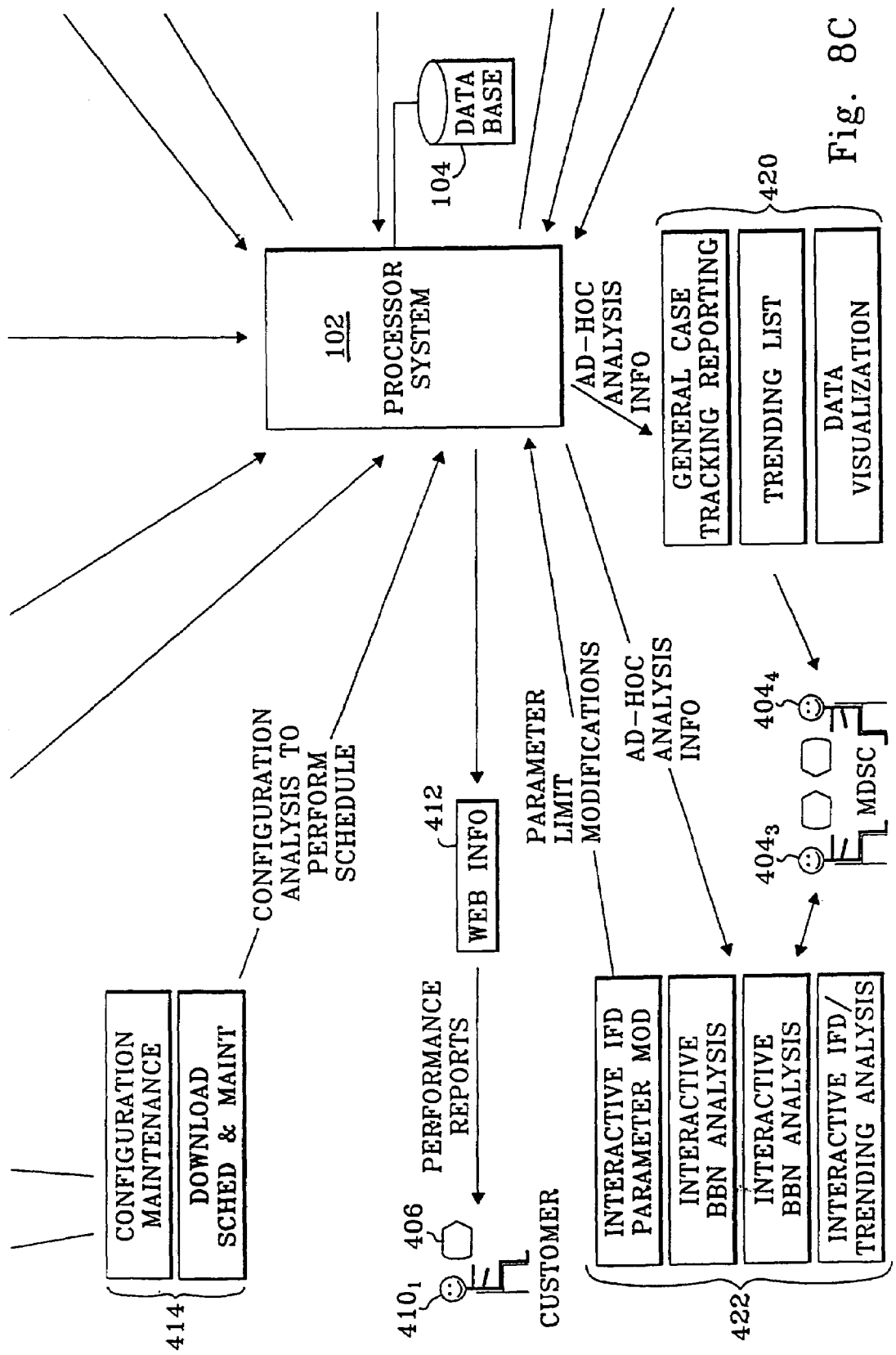
FIG. 8 shows an exemplary schematic of the system of the present invention operatively interconnected to communicate between one or ore locomotives and a monitoring diagnostic service center so as to generate reports to one or more customers and/or schedule diagnostic analysis either automatically or based on any specific needs of the client.
Figure 8D:
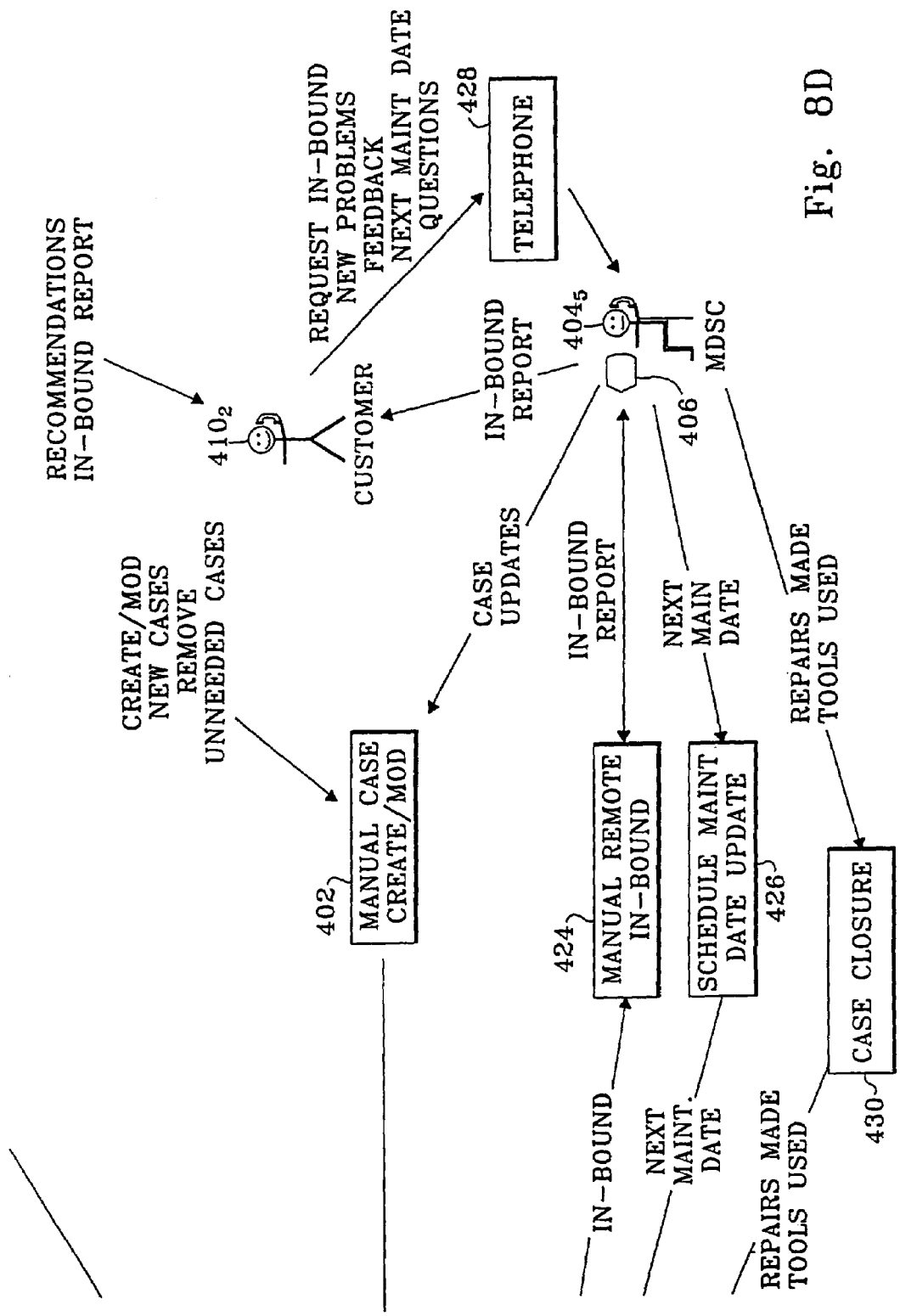

FIGS. 6A and 6B collectively illustrate an exemplary flow chart of the process of the call home notification that may implemented by the call home module 401 (FIG. 8). Upon start up, step 250 allows for obtaining initialization parameters, such as call home directory, sleep time, etc., from a predetermined configuration table. Step 252 allows for monitoring a signature file directory regarding call home downloads since upon a locomotive making a call home, a signature file would be written in a predetermined directory. Thus, at 252, the call home notification module monitors the signature file directory for any files written therein. At 254, if any such signature file is found, then step 256 allows for identifying the respective locomotive that generated the call home request. The signature file for the respective locomotive carries information, such as customer number, road number, etc., for the particular locomotive. If no signature files are found at 254, then step 258 allows for setting the notification process in a respective sleep state for a predetermined sleep time, until a new iteration is started at monitoring step 252.

As suggested above, the notification module identifies at 256 relevant details of the respective locomotive that has made the call come and determines whether an immediate download has to be carried out or not for that locomotive. If, at 260, no locomotive is identified or found in service, then step 262 allows for creating a problem case. Conversely, if a suitable locomotive identification is made at 260, then step 264 allows for determining or identifying the call home type and then processing the call home based on the identified call home type. It will be appreciated that the OBM may call back if a critical event or fault is detected on the OBM, or on completion of a custom data collection request made by the MDSC. Since the level of urgency associated with the call home type may be different, then the two different types of call home occurrences should be handled separately. By way of example, the call home type could be determined by either the filename written by the OBM or by the directory the OBM writes the file in. If, at 264, the call home type is determined to be due to a critical event occurrence on the OBM, then the process continues at step 266. If, however, the call home is of the type for notifying completion of the collection of the custom data, then, the call home should be processed as a custom data download.

At 266, the call home module searches for an existing download case for the above-identified road number and customer. It will try to find an existing open download case for which the download is not complete, such as may be detected when a predetermined field is set to indicate the number (e.g., represented by letter Y) of incomplete downloads, e.g., field "dl_cpt !="Y"). If, at 266, any such case is found and it is of type "normal", then steps 270, 272 . . . 280, allow for converting the case into a "call home" type download. If the case found is of any type other than "normal" then the "call home" process will create a new "call home" type download case. If at 266 no download case is found for the locomotive, then a problem case will be created at 262.

It will be appreciated that steps 270 through 280 allow for promptly scheduling a call home download upon a request from a respective locomotive. For example, to schedule the call home case for an immediate download, the call home notification module will move the download case to the "due" queue and make the "due time" equal to the current time. It will also change the priority of the download. (DL_priority=1). At 282, after changing the status of a case, the call home module will notify, through a suitable signal the Task Manager module so as to inform the Task Manager module that a change in the status of a case has occurred and that such module needs to act. The notification should further include at least a person who is designated as responsible for servicing the respective malfunctioning subsystem that triggered the call home. On the occurrence of a call home, at 262 the call home module should create a problem case notifying that a call home has occurred and also identifying the specific locomotive that has called. As suggested above at 266, if the call home module does not find an existing download case for the locomotive that has made the call home, it will notify through the above created Problem case that a download case was not found for the locomotive. Similarly as suggested above at 260, if the call home module does not find the locomotive that has called to be in service, it would then notify through the above-created problem case that the locomotive that has called home was not found to be in service. If the call home module finds an existing download case, it will convert a normal type of "call home" download case to the above-described problem case. By way of example, the call home process may use a computer-based batch program to create all call home cases. Once a Problem case file has been appropriately populated, step 284 allows for deleting the signature file from the signature file directory and place that signature file in a call home history directory. Step 286 allows for updating records in the call home directory so as to maintain an accurate history of all call home occurrences. Upon completion of updating step 286, the process loops back so as to iteratively continue with the call home notification.

Figure 7:
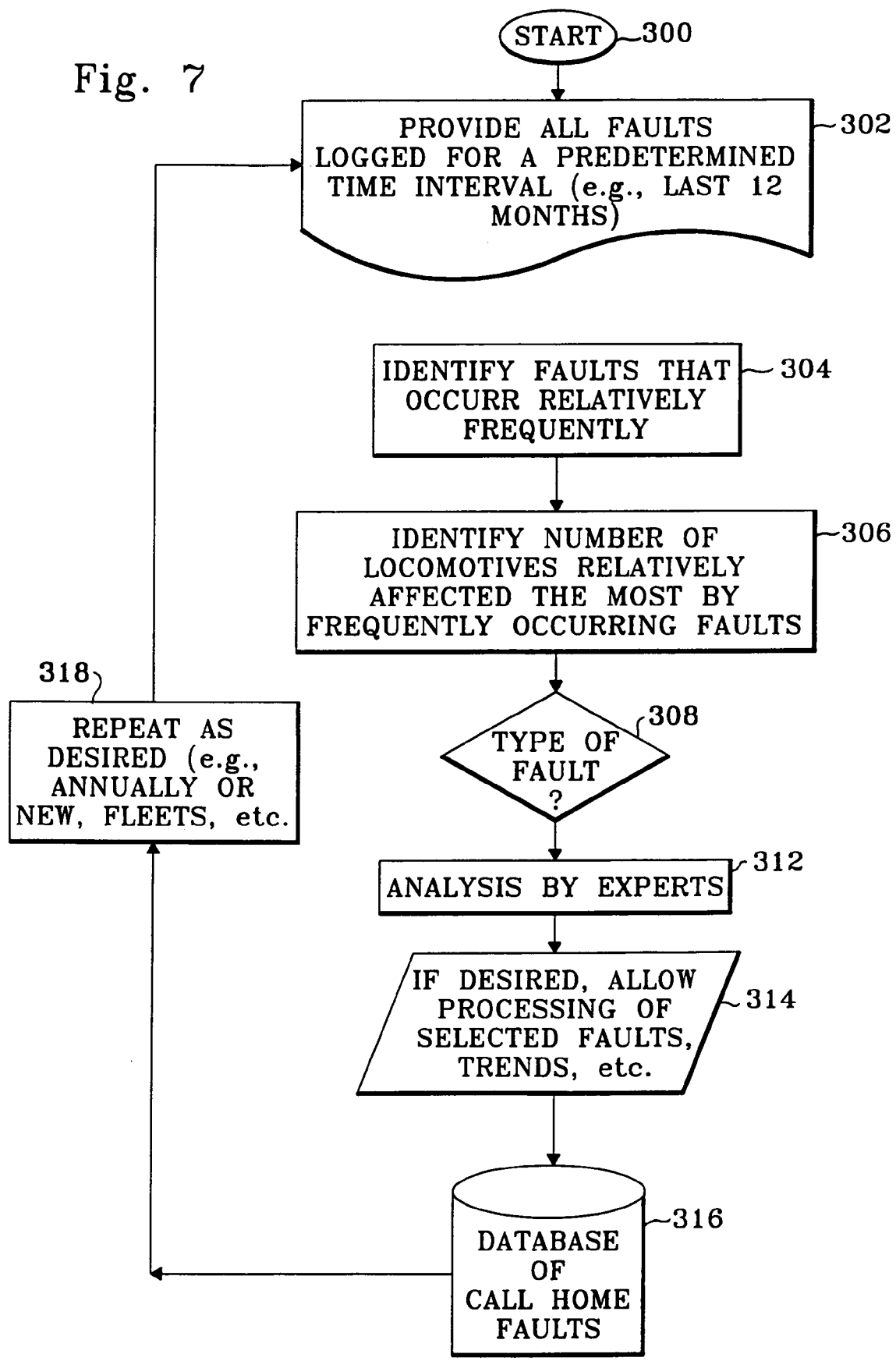
FIG. 7 shows an exemplary flow chart of a process for creating and maintaining a database of critical faults used for triggering the call home process of FIG. 6.

FIG. 7 illustrates an exemplary flow chart of a process for identifying malfunctions, e.g., faults and/or operational parameters, that are indicative of impending locomotive road failures. Upon start of operations at step 300, step 302 allows for collecting or retrieving all faults logged for a predetermined time interval, e.g., last 12 months or any other selected time interval. Step 304 allows for classifying or identifying faults that occur relatively frequently. Step 306 allows for classifying or identifying the number of locomotives that are relatively affected the most by the frequently occurring faults. For example, as shown in Table 3 below, fault code 1000 occurs 1306 times over a predetermined time interval, fault code 1001 occurs 500 times over the same time interval, and fault code 1002 occurs 1269 times over the same time interval. As further shown in Table 2, although fault code 1002 occurs more frequently relative to fault code 1001, since the number of locomotives affected by fault code 1001 is larger compared to the number of locomotives affected by fault code 1002, then the relative ranking of fault code 1001 in terms of fleet percentage affected is higher for fault code 1001 than for fault code 1002. Step 308 allows for classifying the faults into various types of faults, e.g., critical, restrictive, non-restrictive, special interest, etc. As used herein, a critical fault is a malfunction indication that would indicate imminent complete loss of locomotive power, potential damage to the failing subsystem and/or locomotive, or safety issues. A restrictive fault is a malfunction indication that would prevent the locomotive from operating at full power or performance due to, for example, mechanical, electrical and/or traction power malfunctions. A special interest fault may be incorporated into a respective field project, may be used for monitoring trending of predetermined operational parameters, etc. It will be appreciated that each of classifying steps 304, 306, and 308 is illustrative of one of three criteria that in one exemplary embodiment may be separately processed in sequence to generate a respective classification and wherein each classification is based on the results of any previous classification so that the faults found to be critical include properties in all three classifications. It will be appreciated, however, that the present invention is not limited to the above-described exemplary sequence since any of the three criteria may comprise a first basis of classification, and a second classification could be based on the results of that first classification so that any faults found to be critical include properties in at least two of the classifications. For example, the first basis of classification could be classifying step 304, i.e., this would allow for quantifying the specific faults that occur most frequently. The second basis of classification could be step 308, i.e., this would allow for further classifying the most frequently occurring faults based on their likely impact to the functional operation of the locomotive. Thus, the process is not limited to processing all three classifying steps 304, 306 and 308 in that order being that such steps could performed in other sequences and not necessarily including all three classifying steps.

TABLE 3

| Fault | No. of Occurences | No. of Locomotives | Percentage of Fleet |
|---|---|---|---|
| 1000 | 1306 | 102 | 39% |
| 1001 | 500 | 83 | 32% |
| 1002 | 1269 | 80 | 31% |
| 1003 | 541 | 70 | 27% |

Step 312 allows for conducting expert analysis or review by expert personnel, e.g., MDSC personnel and/or engineering teams responsible for servicing any affected subsystems, e.g., traction motors, fuel delivery subsystem, etc.

As suggested above, step 314 allows for processing, if desired, special interest faults, failure trends, etc. Step 316 allows for storing in a suitable database every fault that would trigger a respective locomotive to make a call home request. As shown at step 318, the process is an iterative process that may be repeated so as to maintain an up-to-date database of call home faults. The updating may be performed at predetermined time intervals, or may be performed due to special events, such as deployment of new models of locomotives, locomotive upgrades, etc.

As illustrated in FIG. 8, in operation, the system 100 of the present invention allows, as conceptually represented by block 400, for remotely notifying from the Monitoring and Diagnostics Service Center (MDSC) to the Onboard Monitor (OBM) to transmit fault log, data pack, that is, snapshots of predetermined operational parameters and/or conditions, statistics, road number, current time, current date, requester ID, etc. The fault log generally includes a substantially complete list of faults of subsystems of the locomotive, including respective times of occurrence and reset times, if any. The fault log may further provide fault description, statistics and associated data pack information. As suggested above, the data pack contains information pertaining to locomotive conditions just prior to a fault being logged. Each respective fault may have predetermined data pack information associated therewith. The statistics may comprise historical locomotive information contained in a fault log, such as historical information pertaining to engine duty cycle and may include respective line histories of locomotive notch time, mileage and total power generated by the engine of the locomotive.

It will be appreciated that system 100 further allows, as conceptually represented by block 402, any respective operators at the MDSC, e.g., operators 404, and 4042, to monitor downloads in process and/or in queue and identify the type of download (e.g., automatic, manual, call home, etc.), their respective download priority, owner and controlling device. A respective graphical user interface (GUI) 406 allows for viewing, pausing, deleting and reordering of any in-process downloads. A download schedule file may be automatically populated by a customer contract table. By way of example, GUI 406 may readily display and allow for modification of respective locomotive downloads, based on predetermined criteria, such as road number, fleet, customer, model, etc.

It will be understood that each respective download data comprises all the data received from a respective locomotive. As suggested above, the download data includes but is not limited to fault logs, data packs, statistics, event recorder, vendor equipment fault logs, sensor data, monitored parameters, navigation information, trending anomalies, etc. The download data may be readily formatted to automatically fit into an analysis scheduling subsystem 408 that contains suitable diagnostic analysis tools, such as Case Based Reasoning, Bayesian Belief Network and any other suitable analysis tools. As will be readily understood by those skilled in the art, a Case-Based Reasoning diagnostic tool is a case-based expert system, which in this application may utilize locomotive fault logs and case history to aid isolate problems in any respective locomotive subsystem. Further, a Bayesian Belief Network diagnostic tool is a rule-based expert system, which may also utilize locomotive fault logs to isolate problems in the locomotive system. For example, when CBR/BBN or any other anomaly detection tool in analysis scheduling subsystem 408 detects a potential locomotive problem, the tool will automatically open a case and insert all known data into the case such as railroad, road number, critical faults, weighted problem diagnosis, etc. A statistics log file may be used for tracking statistics information for the CBR, BBN and any other diagnostics tools. The information tracked may include but need not be limited to time to diagnosis, accuracy of diagnostics and/or repairs, number of times used, occurrences of no trouble found and model type comparison. The statistics log may be configured so that the graphical user interface allows for user-friendly manipulation of data. For example, generation of reports may be implemented in graphical and/or tabular format with electronic editing, copying, cutting and pasting options.

As suggested above, system 100 allows for notifying the MDSC supervisor or any other designated person of any failed download request. By way of example, a notification file would identify the specific download failure, time of failure, priority, requester, road number, type of download (auto/manual), etc. The output could be in the form of an e-mail alert sent within a relatively short period of time after the failure, e.g., within 5 minutes of the failure. If the e-mail alert is not answered within another predetermined time period, e.g., 30 minutes, a pager or other suitable communication device should alert any designated personnel of the failure. If the download is a manual request, the requester should also be alerted. The notification file may also be configured so that the GUI allows copying, cutting and pasting into other documents as well as searching capabilities.

The system may be configured to generate periodic reports, e.g., weekly monthly, etc., based on the log of diagnostic statistics and may be further configured to automatically forward the report to the MDSC supervisor, or any other designated person, such as any authorized customers 410. As represented by block 412, the report may be configured to be distributed through the Internet or an intranet via a predetermined Web server using techniques well-understood by those skilled in the art. The Web-based report should similarly allow copying, cutting and pasting into other documents as well as searching capabilities. As conceptually represented by blocks 414, an off-board configuration table may contain locomotive specific information, such as respective software versions, hardware and customer optional equipment stored by customer and road number. The locomotive configuration would have information pertaining to any specific model and option codes that may be used in any given locomotive configuration. This information is programmed into the respective locomotive computers during installation and is accessible as parameters that may be remotely monitored from the MDSC. As suggested above, the contract information table may be used for automatically inserting all pertinent contract information about a locomotive into a case when the case is first opened. The operator should have the ability to override coverage information and accept cases regardless of whether the locomotive is or is not covered under a respective service contract. By way of example, each non-covered unit or case may be highlighted on the MDSC operation manager's monthly reports and forwarded to the MDSC integrator.

The system may be configured so that locomotive configuration data automatically populates a case when the operator opens a new case with basic locomotive identification information, such as road number, model, fleet, etc. A clickable virtual key or button in the GUI may allow the operator, for example, to view configuration information for the locomotive road number entered in a case. Further, any Case Based Reasoning, Bayesian belief output or any other diagnostic tool recommendations from analysis scheduling subsystem 408 may be automatically inserted into the proper case fields. For example, fields indicating detection of any incipient failures, repair recommendations, etc. In the case of a notification field, such field may include a respective railroad contact list containing name, job title, location, address, phone number, fax number, e-mail address, etc. Further, case files could have provisions for entering serial number of RU's. Assigned case numbers may readily be chosen to reflect fiscal week, year and weekly case sequence number. As conceptually represented by block 416, each respective case file may automatically display the last download date, next scheduled download and its priority as well as frequency of downloads. As suggested above, in operation, the open case log may be configured to list respective cases waiting for review by priority in a real time window that automatically inserts new cases and refreshes itself as such cases are respectively reviewed. As represented by block 418, the open case log may be further configured to identify all repeat cases on the same locomotive or cases being currently worked by someone else other than through the MDSC.

When a case is automatically opened or edited within a case tracking module, a diagnostic specialist may be notified, via e-mail or any other suitable form of communication within a relatively short period of time (e.g., 5 minutes or less from the time the case was opened). The basic condition or problem may then be relayed to other specialists so that a preliminary evaluation of the urgency of the case can be determined. If the e-mail is not answered within 30 minutes, the message will be forwarded to designated personnel groups through suitable communication devices such as pagers, etc. An open reminder log may track e-mail and pager response and, if needed, generate a periodic, e.g., daily, reminder file for the MDSC manager.

As conceptually represented by blocks 420, in a manual mode of operation, designated MDSC expert operators may validate case output from any of the anomaly detection tools using one or more of various validation techniques, such as knowledge gained from previous cases, respective product knowledge, fault analysis manual, field modification instruction, fault diagnostic specification, respective locomotive history, etc., to validate case output before it is used by the analysis scheduling module. When MDSC operators close an invalid case, the case should be saved along with the reason for its rejection. Rejected cases should be separately researched and recommendations made to update the anomaly detection tools in an effort to eliminate further occurrences. As further represented by blocks 422, the system allows for interactively analyzing locomotive parameters so as to proactively download predetermined operational parameters that may be indicative of incipient failures in one or more of the subsystems of the locomotive. The interactive analysis allows for increasing the probability of detection of any such incipient failures by using expert knowledge to fine tune the various diagnostics tools. For example, such expert knowledge may be used for modifying respective ranges which would indicate acceptable subsystem performance, degraded performance or unacceptable subsystem performance.

As suggested above, in operation the on-site integrator and the MDSC may develop customer report forms and deliver them to the customer per pre-established requirements. As conceptually represented by blocks 424 and 426, customer inbound inspection forms and reports may be completed at predetermined time intervals, such as, but not limited to daily, monthly, etc., time intervals. Further, open cases and reports stored in database 104 should be automatically populated by the processor system 102 as new information becomes available. System 100 may be configured to interface with the computer system of respective customers so as to automatically insert the type, date, etc., of the next scheduled maintenance. The MDSC operator should verify this information when communicating (e.g., via telephone 428 or any other suitable communication device) to the customer before closing a respective case. The file which stores historical railroad maintenance should be automatically updated from information entered into case tracking records. An error checking routine may be programmed to alert MDSC operators whether they are about to accept data that may be erroneous, such as may occur if data is obtained outside of the respective locomotive normal maintenance cycle.

As conceptually represented by block 430, the MDSC operator should verify with the locomotive owner whether the recommended repair actually fixed the reported problem. Any discrepancies in the cases should be modified to reflect actual repairs versus suggested repairs before closing the case. It will be appreciated that entering a date into a closed case field automatically closes the case and makes it available for use by any of the diagnostic tools. Thus, upon case closure, the system provides feedback to automatically update the CBR, BBN and any other anomaly detection or tracking tools. Further, after closing a case all information pertaining to the effectiveness of anomaly detection tools, MDSC and customer satisfaction should automatically update any case scorecards and any MDSC performance tracking software module.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A computer-implemented method for identifying critical faults from unranked fault data collected from a fleet of locomotives, the method comprising:
  a) collecting from a group of the fleet of locomotives respective locomotive data indicative of each fault logged over a predetermined period of time;
  b) classifying respective faults in the collected locomotive data based on the following criteria:
    1) relative frequency of fault occurrence;
    2) number of locomotives affected in the group; and
    3) expected level of reduction in locomotive operational performance;
    wherein any of the three criteria comprises a first basis of classification, and a second classification is based on the results of the first classification so that any faults found to be critical include properties in at least two of the classifications, and further wherein all three criteria are separately considered in sequence and further wherein each classification is based on the results of any previous classification so that the faults found to be critical include properties in all three classifications; and
  c) storing any faults found to he critical in a database comprising critical faults.

2. A computer-implemented method for identifying critical faults from unranked fault data collected from a fleet of locomotives, the method comprising:
  a) collecting from a group of the fleet of locomotives respective locomotive data indicative of each fault logged over a predetermined period of time;
  b) classifying respective faults in the collected locomotive data based on the following criteria:
    1) relative frequency of fault occurrence;
    2) number of locomotives affected in the group; and
    3) expected level of reduction in locomotive operational performance;
    wherein any of the three criteria comprises a first basis of classification, and a second classification is based on the results of the first classification so that any faults found to be critical include properties in at least two of the classifications; and
  c) storing any faults found to be critical in a database comprising critical faults, and wherein the database of critical faults is used in a process for assigning priorities to communications of electronic data between a diagnostic service center and a plurality of locomotives generally remote relative to each other, the assigned priorities being used for managing the handling of such communications, the electronic data comprising at least respective new locomotive data from selected locomotives, the process comprising:
    storing in a database a list of respective cases to be processed;
    assigning to each case a respective download priority based on the existence of critical faults in the case; and
    determining each case to be populated next with new locomotive data based at least upon the assigned download priority.

3. The method of claim 2 further comprising executing a download of new locomotive data wherein said download of new locomotive data is triggered upon a call from a respective locomotive to the service center, the call identifying occurrence in the respective locomotive of one or more faults of the type stored in the critical fault database.

4. The method of claim 3 further comprising prioritizing analysis of locomotive data including critical faults.

5. A system for identifying critical faults from unranked fault data collected from a fleet of locomotives, the system comprising:
  memory configured to collect from a group of the fleet of locomotives respective locomotive data indicative of each fault logged over a predetermined period of time;
  a first classifier configured to classify in the collected locomotive data respective faults most frequently occurring relative to one another;
  a second classifier configured to classify in the most frequently occurring faults from the first classifier, respective faults that, relative to one another, affect a higher number of locomotives in the group;
  a third classifier configured to classify the faults from the second classifier based on an expected level of I reduction in locomotive operational performance; and
  a database coupled to the third classifier to store any faults classified as likely to result in an imminent locomotive mission failure, the stored faults comprising the plurality of critical faults, and wherein the database of critical faults is used in a processor for managing communication of electronic data between a diagnostic service center and the plurality of locomotives situated generally remote relative to each other, the electronic data comprising new locomotive data used from selected locomotives, the processor comprising:
    a module configured to execute a download of the new locomotive data wherein said download of new locomotive data is triggered upon a call from a respective locomotive to the service center, the call identifying occurrence in the respective locomotive of one or more faults of the type stored in the critical fault database.

6. The system of claim 5 wherein the call to the service center is automated upon detection in the locomotive of one or more of the faults of the type stored in the critical fault database.

7. A system for identifying critical faults in unranked fault data collected from a fleet of locomotives, the system comprising:
- memory configured to collect from a group of the plurality of locomotives respective locomotive data indicative of each fault logged over a predetermined period of time;
- a processor configured to classify respective faults in the collected locomotive data based on the following criteria:
  1) relative frequency of fault occurrence;
  2) number of locomotives affected in the group; and
  3) expected level of reduction in locomotive operational performance;
  wherein any of the three criteria comprises a first basis of classification, and a second classification is based on the results of the first classification so that any faults found to be critical include properties in at least two of the classifications, and further wherein all three criteria are separately processed by the processor in sequence and further wherein each classification is based on the results of any previous classification so that the faults found to be critical include properties in all three classifications.

8. A system for identifying critical faults in unranked fault data collected from a fleet of locomotives, the system comprising:
- memory configured to collect from a group of the plurality of locomotives respective locomotive data indicative of each fault lagged over a predetermined period of time;
- a processor configured to classify respective faults in the collected locomotive data based on the following criteria:
  1) relative frequency of fault occurrence;
  2) number of locomotives affected in the group; and
  3) expected level of reduction in locomotive operational performance;
  wherein any of the three criteria comprises a first basis of classification, and a second classification is based on the results of the first classification so that any faults found to be critical include properties in at least two of the classifications, and further wherein all three criteria are separately processed by the processor in sequence; and
- a database for storing faults found to be critical, wherein the database of critical faults is used by a priority-assigner processor configured to assign priorities to communications of electronic data between a diagnostic service center and a plurality of locomotives generally remote relative to each other, the assigned priorities being used for managing the handling of such communications, the electronic data comprising at least respective new locomotive data from selected locomotives, the priority-assigner processor comprising:
  - a database configured to store a list of respective cases to be processed;
  - a module configured to assign to each case a respective download priority based on the existence of critical faults in the case; and
  - a module configured to determine each case to be populated next with new locomotive date based at least upon the assigned download priority.

9. The system of claim 7 further comprising a download module configured to execute a download of new locomotive data wherein said download of new locomotive data is triggered upon a call from a respective locomotive to the service center, the call identifying occurrence in the respective locomotive of one or more faults of the type stored in the critical fault database.

* * * * *